(12) United States Patent
Hinman et al.

(10) Patent No.: US 8,933,788 B2
(45) Date of Patent: Jan. 13, 2015

(54) RFID SYSTEM WITH BARRIERS AND KEY ANTENNAS

(75) Inventors: Mark P. Hinman, Holley, NY (US); Donald Saul Rimai, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 383 days.

(21) Appl. No.: 13/532,874

(22) Filed: Jun. 26, 2012

(65) Prior Publication Data

US 2013/0342323 A1      Dec. 26, 2013

(51) Int. Cl.
    *H04Q 5/22*     (2006.01)
(52) U.S. Cl.
    USPC ...................................................... 340/10.1
(58) Field of Classification Search
    CPC ............ G06K 7/0008; G06K 7/10079; G06K 19/0723; G06K 19/07749; G06K 2017/0045; G01S 13/751; G01S 7/36
    USPC .......................... 340/10.1–10.52, 568.1–572.9
    See application file for complete search history.

(56) References Cited

U.S. PATENT DOCUMENTS

| | | | |
|---|---|---|---|
| 4,968,945 A | 11/1990 | Woskov et al. | |
| 6,725,014 B1 | 4/2004 | Voegele | |
| 7,086,587 B2 | 8/2006 | Myllymaki | |
| 7,969,286 B2 | 6/2011 | Adelbert | |
| 8,025,228 B2 | 9/2011 | Dearing et al. | |
| 2002/0011967 A1* | 1/2002 | Goff et al. ...................... | 343/895 |
| 2003/0206107 A1* | 11/2003 | Goff et al. .................. | 340/572.7 |
| 2006/0103535 A1* | 5/2006 | Pahlaven et al. ........... | 340/572.1 |
| 2006/0250250 A1* | 11/2006 | Youn ........................... | 340/572.7 |
| 2007/0077888 A1 | 4/2007 | Forster | |
| 2007/0108296 A1 | 5/2007 | Konopka et al. | |
| 2007/0257796 A1* | 11/2007 | Easton et al. ............... | 340/572.1 |
| 2007/0285239 A1* | 12/2007 | Easton et al. ............... | 340/572.1 |
| 2008/0100446 A1* | 5/2008 | Shintani ..................... | 340/572.2 |
| 2008/0117052 A1* | 5/2008 | Tiernay ...................... | 340/572.4 |
| 2008/0129509 A1* | 6/2008 | Duron ......................... | 340/572.4 |
| 2008/0258877 A1* | 10/2008 | Rodgers ....................... | 340/10.3 |
| 2008/0315996 A1 | 12/2008 | Domokos et al. | |
| 2009/0021343 A1 | 1/2009 | Sinha | |
| 2009/0174556 A1 | 7/2009 | Horne et al. | |
| 2009/0206998 A1* | 8/2009 | Tiernay ........................ | 340/10.1 |
| 2009/0302972 A1 | 12/2009 | Osamura et al. | |
| 2010/0038426 A1* | 2/2010 | Casden ......................... | 235/439 |
| 2010/0060424 A1* | 3/2010 | Wild et al. ................... | 340/10.1 |
| 2010/0102969 A1 | 4/2010 | Svalesen et al. | |
| 2010/0148968 A1* | 6/2010 | Casden ....................... | 340/572.7 |
| 2010/0253481 A1* | 10/2010 | Zand ............................ | 340/10.3 |
| 2010/0265302 A1 | 10/2010 | Laramie et al. | |
| 2011/0025470 A1* | 2/2011 | Tiernay ........................ | 340/10.2 |
| 2011/0133901 A1* | 6/2011 | Strzelczyk et al. .......... | 340/10.2 |
| 2011/0169607 A1* | 7/2011 | Paulson ........................ | 340/10.1 |
| 2012/0169500 A1* | 7/2012 | Stern ........................... | 340/572.1 |
| 2012/0249302 A1* | 10/2012 | Szu .............................. | 340/10.1 |

* cited by examiner

*Primary Examiner* — Hai Phan
*Assistant Examiner* — Orlando Bousono
(74) *Attorney, Agent, or Firm* — Christopher J. White

(57) ABSTRACT

An RFID system includes a reader with antenna, a first barrier, a tag with a link antenna, a second barrier, and two key antennas connected to the tag, mechanically arranged in that order. The first barrier has two or more apertures in it to produce an interference pattern of a security signal from the reader. The security signal interference pattern passes at least partly through the second barrier. One of the key antennas is at a peak of the pattern after passing through the second barrier, and one is not. The tag includes a controller responsive to a downlink signal from the reader to transmit an uplink signal using the link antenna, but only if the downlink signal is preceded by the security signal and the security signal is received more strongly by the key antenna at the peak than by the other key antenna.

11 Claims, 4 Drawing Sheets

RFID SYSTEM WITH BARRIERS AND KEY ANTENNAS

CROSS-REFERENCE TO RELATED APPLICATIONS

This application is co-filed with and has related subject matter to U.S. patent application Ser. No. 13/532,821, filed herewith, titled "RFID SYSTEM WITH MULTIPLE TAG TRANSMIT FREQUENCIES;" U.S. patent application Ser. No. 13/532,845, filed herewith, titled "RFID READING SYSTEM USING RF GRATING;" U.S. patent application Ser. No. 13/532,859, filed herewith, titled "RFID SYSTEM WITH ENCLOSURE AND INTERFERENCE PATTERN;" U.S. patent application Ser. No. 13/532,831, filed herewith, titled "RFID SYSTEM WITH MULTIPLE READER TRANSMIT FREQUENCIES;" U.S. patent application Ser. No. 13/532,840, filed herewith, titled "READING RFID TAG USING ANTENNA WITHIN ENCLOSURE;" and U.S. patent application Ser. No. 13/532,826, filed herewith, titled "RFID SYSTEM WITH CONFIGURABLE RF PORT;" all of which are incorporated herein by reference.

FIELD OF THE INVENTION

This invention pertains to the field of radio-frequency communication between radio-frequency identification (RFID) tags and RFID readers, and more securing such communication.

BACKGROUND OF THE INVENTION

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), 2.4 GHz, or 5.8 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

However, RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data. This process is called "skimming," and such rogue readers are referred to as "skimmers." The skimmer can later replay the stored data (a "replay attack") to pretend to be the skimmed tag ("spoofing"). This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Home et al. describes an RFID blocker that disrupts an RFID reader's signal to a tag when the blocker is physically near the tag. However, the blocker will disrupt all accesses, not just unauthorized access. In another scheme, U.S. Patent Publication No. 2009/0021343 by Sinha describes jamming or spoofing skimmers, either using authorized electronics or intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag. Moreover, tags affixed to objects are often used in factory or retail contexts in which a large number of tagged instances or packages (e.g., as described in U.S. Patent Publication No. 2009/0302972) carry RFID tags. This can result in contention between tags for the bandwidth, reducing the number of tags that can be read in a certain amount of time. For example, U.S. Patent Publication No. 2010/0265302 describes RFID tags on liquid ink containers. However, this reference does not recognize difficulties that can be encountered in reading RFID tags attached to RF-attenuating containers of liquid. Moreover, containers can come in various sizes and shapes, which can require adjusting antenna directions and gains to read at a desired rate of read success. Various prior-art schemes use readers with directional antennas to reduce the area of operation in which a skimmer can detect that a read is in progress.

U.S. 2010/0102969 describes a "Faraday shield" that reduces reading of unwanted RFID objects. This shield affects the radiation pattern of the antennas to reduce their power in the direction of the unwanted objects, but does not control access to tags in the direction of wanted objects. Consequently, an unwanted rogue tag, which could be active instead of passive, and thus much higher-powered than a standard tag, could still be accessed by the reader. Moreover, the shield might increase gain in the wanted direction, making it easier for an attacker to place a rogue tag within range of the reader.

U.S. Patent Publication No. 2009/0174556 by Horne et al. describes an RFID blocker that disrupts an RFID reader's signal to a tag when the blocker is physically near the tag. However, the blocker will disrupt all accesses, not just unauthorized access. Moreover, this scheme requires the blocker and the tag be moved apart from each other to access the tag. There is a continuing need, therefore, for a way of controlling access to RFID tags located in known positions, e.g., attached to containers.

U.S. Pat. No. 8,025,228 describes distribution of products in a restricted access unit near the customer. Products are equipped with RF tags. A plurality of RF tagged products is placed within a cabinet that has a door or opening that can detect access to the cabinet. One or more antennas are positioned within the door. Each antenna may have a transmission line of sight and be configured to emit a signal at predefined frequencies. Each antenna generates an electromagnetic field within the micro-warehouse. In one embodiment, the products are positioned in one or more bins, compartments, or similar devices located within the micro-warehouse such that at least two of the plurality of products are spaced a distance from each other to reduce energy sharing. The electromagnetic field is moved or altered within the micro-warehouse through the use of reflectors, devices that move the antennas, or other mechanisms. However, this scheme is not applicable to environments such as retail stockrooms in which the tagged items are not confined in a cabinet.

U.S. Pat. No. 4,968,945 to Woskov et al., the disclosure of which is incorporated herein by reference, describes diffraction of radiation introduced to a straight-lumen waveguide.

There is, therefore, a continuing need for ways of reading RFID tags securely, in tag-rich environments.

SUMMARY OF THE INVENTION

According to an aspect of the present invention, there is provided an RFID system, comprising:

a) an RFID reader having an antenna located at a reader-antenna location, the RFID reader adapted to transmit a security signal at a selected RF security frequency and a downlink signal at a selected RF downlink frequency and to receive an uplink signal at a selected RF uplink frequency;

b) a first RF-attenuating barrier spaced apart from the antenna of the RFID reader, wherein:

i) the first barrier includes a port having first and second apertures, each aperture having a respective centroid and a respective selected shortest dimension, and the centroids being spaced apart by a respective centroid spacing, so that a security interference pattern is formed on the side of the first barrier opposite the antenna of the RFID reader when the security signal passes through the port, a downlink interference pattern is formed on the side of the first barrier opposite the antenna of the RFID reader when the downlink signal passes through the port and an uplink interference pattern is formed on the side of the first barrier towards the RFID reader when the uplink signal passes through the port; and ii) the first barrier is positioned with respect to the reader-antenna location to define a link-antenna location at which the downlink interference pattern provides a selected downlink power at the link-antenna location, and an interference pattern of the uplink signal passing through the port provides a selected uplink power at the reader-antenna location;

c) a second RF-attenuating barrier spaced apart from the first barrier and on the opposite side thereof from the antenna of the RFID reader, wherein:

i) the link-antenna location is between the first and second barriers;

ii) the second barrier attenuates the security interference pattern less than the downlink interference pattern; and iii) the second barrier is positioned with respect to the first barrier to define one or more peak-antenna locations at peaks of the security interference pattern;

d) an RFID tag including:

i) a link antenna disposed at the link-antenna location;

ii) first and second key antennas disposed beyond the side of the second barrier farthest from the antenna of the RFID reader, wherein the first key antenna is disposed at one of the peak-antenna locations and the second key antenna is not disposed at one of the peak-antenna locations; and iii) a controller adapted to transmit the uplink signal using the link antenna after first receiving the security signal at the first key antenna but not the second key antenna and thereafter receiving the downlink signal using the link antenna.

An advantage of this invention is that it restricts the locations from which a reader can communicate with a tag. This reduces the range of positions from which a skimmer can monitor or spoof tag transmissions. Various embodiments provide increased security without requiring tags to implement cryptographic algorithms. Various embodiments move one or both of the barriers to restrict communications to only certain time periods, further increasing the difficulty for a skimmer to reach the tag.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

As used herein, the term "uplink" refers to communications from an RFID tag to a reader, and "downlink" to communications from a reader to a tag. These terms are used regardless of which side initiates the communication.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Figure 1:
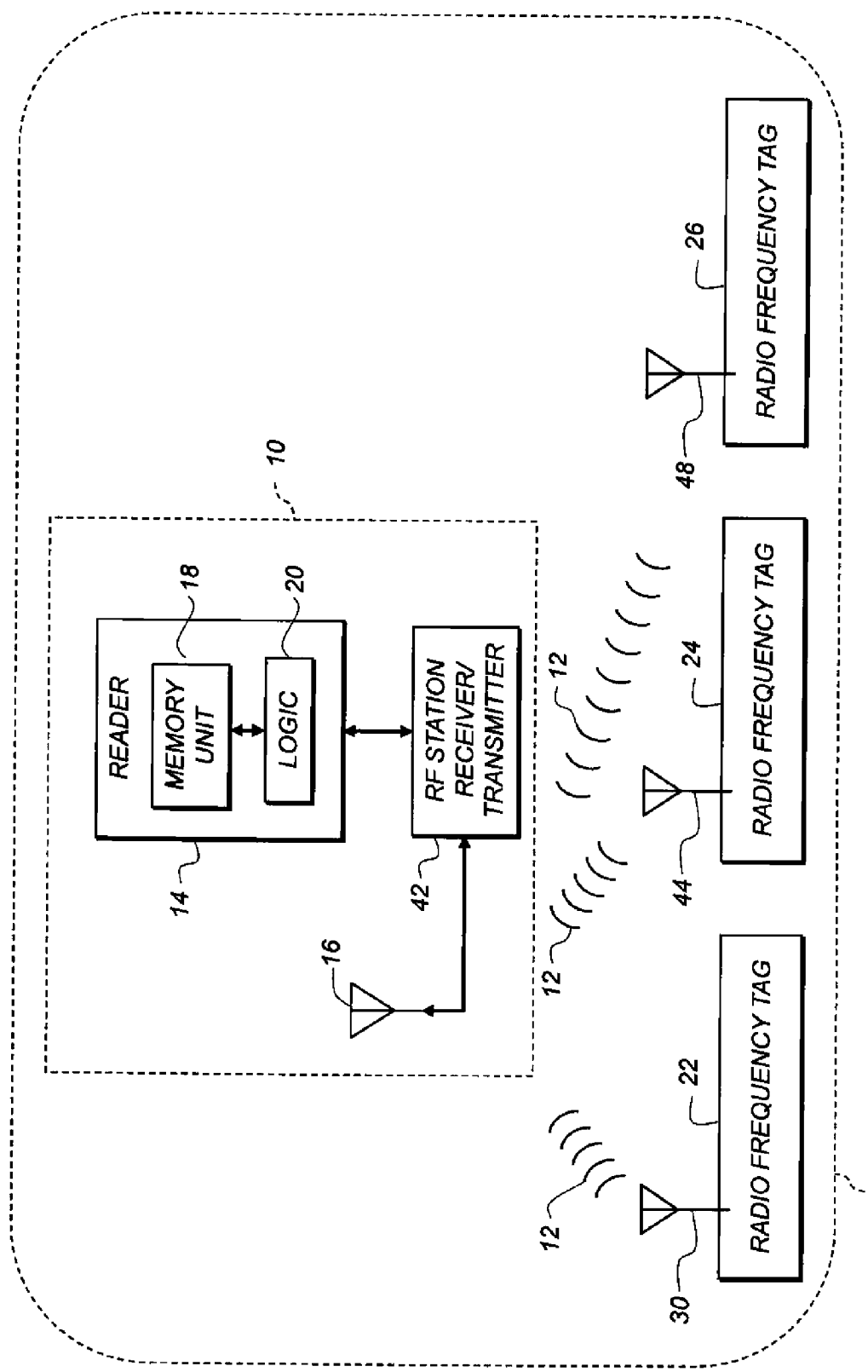
FIG. 1 is a block diagram of an RFID system according to various embodiments.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SGTINs of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52. Reader 14 and tags 22, 24, 26 can communicate using, e.g., the EPC Class-1 Generation-2 UHF RFID Protocol for Communications at 860 MHz-960 MHz, Version 1.2.0, Oct. 23, 2008, incorporated herein by reference.

Figure 2:
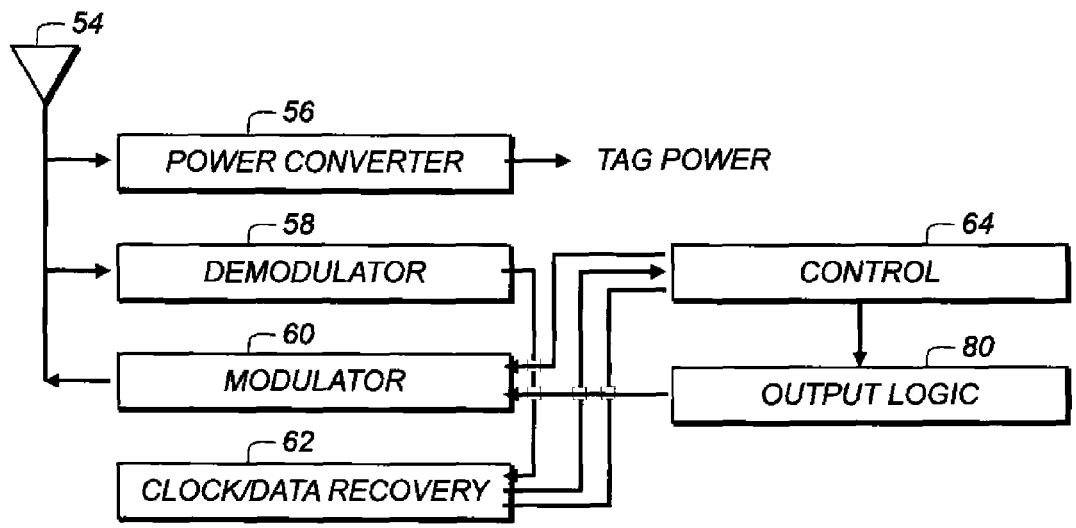
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag-antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
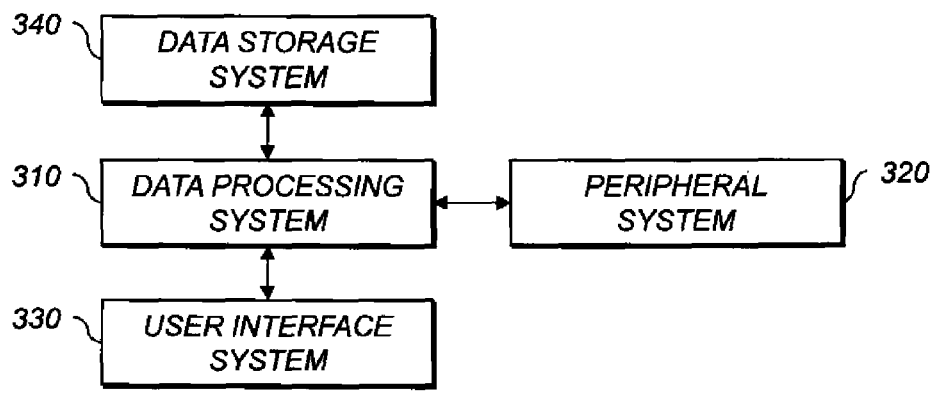
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
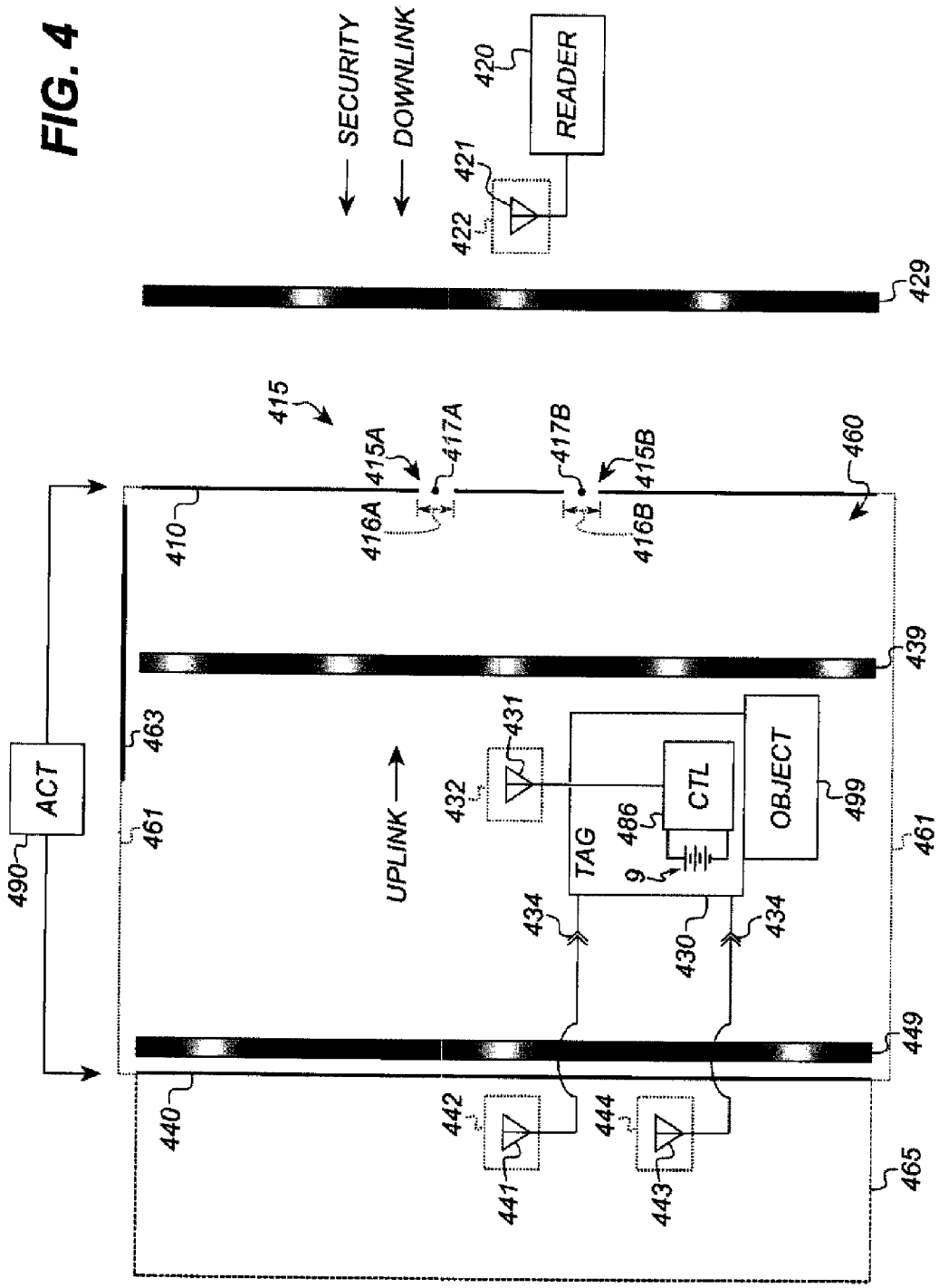
FIG. 4 shows an RFID system according to various embodiments.

FIG. 4 shows an RFID system. Interference patterns described herein are not shown to scale. The arrows labeled "security," "downlink," and "uplink" represent the direction of transmission of the main lobe of the corresponding signal.

RFID reader 420 has antenna 421 located at reader-antenna location 422. Reader 420 is adapted to selectively transmit a security signal at a selected RF security frequency and a downlink signal at a selected RF downlink frequency or range or band of frequencies. Reader 420 can receive an uplink signal at a selected RF uplink frequency or in a range of frequencies. The downlink and uplink signals can be transmitted at the same frequency or different frequencies, or within overlapping or non-overlapping frequency ranges. In various embodiments, the uplink frequency is greater than the downlink frequency. In various embodiments, the security frequency is less than the downlink frequency.

RFID tag 430 includes link antenna 431 coupled to controller 486 and disposed at link-antenna location 432. Tag 430 can be active, semi-active, or passive. Controller 486, which can include a CPU, microcontroller, PLD, PLA, PAL, FPGA, ASIC, or other logic or software-execution device, controls the operation of tag 430. In various embodiments, tag 430 includes battery 9. The tag can be multiple pieces or one assembly. The RFID IC holding controller 486 can be on either side of barrier 410. The operation of tag 430 is discussed below.

First RF-attenuating barrier 410 is spaced apart from reader antenna 421. Barrier 410 substantially blocks RF energy at selected RFID wavelength(s) except through port 415, as is discussed below. Port 415 can include openings or RF-transparent windows. "Blocking" means that barrier 410 is designed (e.g., in shape or material) to attenuate incident RF energy, e.g., from a skimmer, until the energy that passes barrier 410 and reaches link antenna 431 is below the receive sensitivity of RFID tag 430, or the response from RFID tag 430 is below the receive sensitivity of reader 420, or a skimmer, beyond barrier 410. It is not required that the barrier be entirely RF-opaque, whether only at a frequency of interest or over a frequency band.

Barrier 410 includes port 415 having first and second spaced-apart apertures 415A, 415B. Each aperture 415A, 415B can be a hole, a slit, or another shape, and apertures 415A, 415B can have the same shapes or different shapes. Each aperture 415A, 415B has a respective selected shortest dimension 416A, 416B between any two points on the periphery of aperture 415A, 415B. These dimensions affect the propagation characteristics of radio waves through port 415.

Specifically, dimensions 416A, 416B are selected so that the transmissions of the uplink, downlink, and security RF signals through port 415 occur substantially by diffraction rather than transmission. The uplink, downlink, and security wavelengths are selected to satisfy the same requirement. For example, in the far-field (Fraunhofer) approximation in which the distance (D) the downlink signal at the downlink wavelength travels from port 415 to antenna 431 is significantly greater than dimension 416A ($\alpha$), the angular half-width ($\theta$) of the diffraction pattern beyond barrier 410 for downlink wavelength $\lambda$ is:

$$\theta \approx \sin^{-1}(\lambda/\alpha) \quad \text{(Eq. 1)}$$

As a result, the larger the downlink wavelength is with respect to dimension 416A or 416B, the more the downlink signal will spread beyond barrier 410. For example, with $\lambda/\alpha=1$, $\theta \approx 90°$. Consequently, dimensions 416A, 416B can be selected for a selected downlink wavelength so that the interference pattern beyond barrier 410 carries the downlink signal to the location of link antenna 431 (discussed below). For plane waves incident on port 415, the orientation of the interference pattern beyond barrier 410 depends on the direction of incidence of the waves. This restricts the set of locations from which a skimmer can reach tag 430, reducing the probability that skimmers will be able to access tag 430 without detection.

For example, in a factory environment, antenna 421 is located at the appropriate location (reader-antenna location 422) to communicate with tag 430. The location of antenna 421 and reader 420 can be selected so that if skimmer hardware is installed in place of the normal hardware, that change will be visible to factory personnel.

In various embodiments, each aperture 415A, 415B has a respective centroid 417A, 417B, and the centroids 417A, 417B are spaced apart by a centroid spacing. Port 415 includes a third aperture (not shown) with a respective centroid and a respective selected shortest dimension. The centroid of the third aperture is spaced apart from the centroids 417A, 417B of the two apertures 415A, 415B by respective centroid spacings. In various embodiments, any number greater than one of apertures 415A, 415B can be used in port 415. The number, shape, size, and spacing of apertures 415A, 415B in port 415 can be selected to control the reader- and tag-antenna locations, as discussed above. The direction from reader-antenna location 422 to port 415, or a selected point thereon, or the center thereof, can be different than the direction from the port (or a point thereon) to the tag-antenna location by at least 15°.

As a result of the interference of signals diffracted through apertures 415A, 415B, security interference pattern 449 is formed on the side of first barrier 410 opposite reader antenna 421 when the security signal passes through port 415. Security interference pattern 449 is depicted near barrier 440 as discussed below. Moreover, downlink interference pattern 439 is formed on the side of first barrier 410 opposite reader antenna 421 when the downlink signal passes through port 415, and uplink interference pattern 429 is formed on the side of first barrier 410 towards reader antenna 421 when the uplink signal from tag 430 passes through port 415.

Interference patterns are represented graphically using rectangles with alternating light and dark fills shown near barriers 410, 440 or receiver antennas. Light areas represent peaks and dark areas represent nulls. Although interference patterns are represented at specific points along the page left-to-right, the patterns actually fan out from apertures 415A, 415B. Each pattern 429, 439, 449 is represented graphically adjacent to its receiver. Downlink interference pattern 439 is represented adjacent to link antenna 431, which is arranged to receive energy from a peak of pattern 439. Uplink interference pattern 429 is represented adjacent to reader antenna 421, which is arranged to receive energy from a peak of pattern 429. Security interference pattern 449 is represented near, and discussed below with respect to, second barrier 440.

First barrier 410 is positioned with respect to reader-antenna location 422, and apertures 415A, 415B positioned and sized, to define a link-antenna location 432. At link-antenna location 432, downlink interference pattern 439 provides a selected RF downlink power, as discussed below. Uplink interference pattern 429 from antenna 431 at link-antenna location 432 provides a selected uplink power at reader-antenna location 422.

Second RF-attenuating barrier 440 is spaced apart from first barrier 410 and on the opposite side thereof from reader antenna 421. Link-antenna location 432 is between the first and second barriers 410, 440, along the direction from reader-antenna location 422 through link-antenna location 432.

Security interference pattern 449 is represented graphically adjacent to second bather 440. This is used to signify that some of the RF energy in security interference pattern 449 incident on second barrier 440 passes through second barrier 440 in the direction away from reader antenna 421. Second barrier 440 attenuates security interference pattern 449 less than downlink interference pattern 439. That is, a higher percentage of the RF energy incident on barrier 440 from security interference pattern 449 passes through barrier 440 than of the RF energy incident on barrier 440 from downlink interference pattern 439.

In various embodiments, the security signal has a lower frequency (longer wavelength) than the downlink signal. (This is represented graphically by the wider spacing of peaks and nulls in pattern 449 than in pattern 439.) As a result, the skin depth of the security signal is larger than the skin depth of the downlink signal (skin depth is proportional to frequency$^{-0.5}$).

In general, the security signal is attenuated less by barrier 440 than the downlink signal. In an example, the security and downlink frequencies, and the thickness and composition of barrier 440, are selected so that the skin depth of the security-frequency RF energy incident on barrier 440 is greater than the thickness of barrier 440, and the skin depth of the downlink-frequency RF energy incident on barrier 440 is less than the thickness of barrier 440.

Second barrier 440 is positioned with respect to first barrier 410 to define one or more peak-antenna locations 442 at peaks (areas of constructive interference) of security interference pattern 449. One or more null locations 444 are also defined. Peak-antenna locations 442 and null locations 444 are defined on the side of barrier 440 opposite reader antenna 421.

Tag 430 includes (is connected to) first and second key antennas 441, 443 disposed beyond the side of second barrier 440 farthest from reader antenna 421. First key antenna 441 is disposed at one of the peak-antenna locations 442, and second key antenna 443 is not disposed at one of the peak-antenna locations 442. In various embodiments, second key antenna 443 is disposed at null location 444. In various embodiments, first key antenna 441 receives the security signal at a power at least 20 dB higher than does second key antenna 443. Key antennas 441, 443 can be disposed over the same substrate as controller 486 or one or more different substrates.

The connections between antennas 441, 443 and tag 430 are represented graphically using arcs to visually separate them from barrier 440. These connections can be made through holes in barrier 440, and those holes can be filled with an RF-blocking potting compound or other RF-blocking filler around the conductors. Antennas 441, 443 can also be connected to tag 430 wirelessly, e.g., using a very low frequency that penetrates barrier 440, or using a signal with a higher frequency than the frequency of the security signal, that signal transmitted through or around barrier 440 using a waveguide.

The number and configuration of apertures in port 415 can be selected, using antenna-design techniques known in the art, to provide a desired pattern of peaks and nulls. MATLAB, ANSYS MAXWELL, or other field-solver software programs can be used to determine interference patterns for a selected configuration of apertures. For example, as frequency increases, the peaks of the interference pattern move closer together. As the number of apertures (e.g., apertures 415A, 415B) in barrier 410 increases, the width of each peak decreases. Useful design formulas are given in "Interference and Diffraction" by Dr. David Morin, Lecturer on Physics at Harvard, available online and incorporated herein by reference.

Controller 486 in tag 430 is adapted to transmit the uplink signal using link antenna 431 after first receiving the security signal at first key antenna 441 but not second key antenna 443 and thereafter receiving the downlink signal using link antenna 431. This is discussed further below with respect to FIG. 5. In various embodiments, controller 486 in RFID tag 430 is powered by RF energy received by first key antenna 441. This power can be instead of or in addition to power harvested from the downlink signal through link antenna 431.

RF signal power can be measured with respect to the noise floor of the receiver in tag 430 or reader 420, as appropriate. The signal power can be selected so the signal-to-noise (S/N) ratio of the signal at the appropriate receiver exceeds the receiver's sensitivity threshold. In an example, a skimmer with an antenna not along the direction from reader-antenna location 422 to link-antenna location 422 results in a downlink interference pattern (not shown) with the center beam pointing in other than that direction. As a result of the attenuation of the downlink signal power away from the peaks of the interference pattern, the skimmer cannot provide enough power to communicate with tag 430 via link antenna 431. In various embodiments, tag 430 is a passive tag and the RF downlink power is at least the power required to energize tag 430. As used herein, "providing a selected power" refers to providing at least the selected download power, unless explicitly indicated otherwise.

In various embodiments, one or more enclosure members 461 are connected (mechanically or electrically) to barriers 410, 440 to form RF-attenuating enclosure 460 around link antenna 431. Enclosure 460 can attenuate selected or all RF signals except those passing through port 415 below the receive threshold of tag 430. It is not required that the enclosure be entirely RF-opaque, whether only at a frequency of interest or over a frequency band. In various embodiments, RF-attenuating material 463 is positioned inside enclosure 460. For example, the inside of enclosure 460 (except at apertures 415A, 415B) can be lined with RF-absorbing material to reduce signal reflections inside enclosure 460. This simplifies the determination of the downlink-signal interference pattern in enclosure 460. In various embodiments, the material and thickness of the material forming enclosure 460 are selected to provide a desired degree of RF-energy absorption or reflection at the downlink or uplink frequencies. The shape and size of apertures in port 415, the polarization of the signals and the antennas, and the configuration of material 463 can be selected to provide desired interference patterns in and behind enclosure 460.

In various embodiments, RF energy at the security frequency leaks out of enclosure 460 more significantly than RF energy at the downlink frequency. This can advantageously permit the tag to use more of the transmitted downlink energy than would be the case without second barrier 440. In various embodiments, tag 430 includes multiple link antennas in enclosure 460, each positioned to draw energy from a peak of downlink-signal interference pattern 439. The multiple link antennas can also be oriented and driven to provide a desired uplink interference pattern 429.

In various embodiments, a conveyor (not shown) is used to position tag 430, or a non-RFID-active object 499 to which tag 430 is attached, between barriers 410, 440, or within enclosure 460. In various embodiments, object 499 is an RF-attenuating, RF-absorbing, or RF-blocking object. "Non-RFID-active" means object 499 itself does not communicate with reader 420. Instead, tag 430 communicates with reader 420 on behalf of attached object 499. In various embodiments, key antennas 441, 443 are attached to barrier 440, and make electrical connection to tag 430 using pogo pins, cables, or other detachable electrical connectors 434. This permits successively placing tags 430 in enclosure 460 without wiring and rewiring key antennas 441, 443.

In various embodiments, one or more RF-blocking members 465 are connected (mechanically or electrically) to second barrier 440. Members 465 attenuate any stray security signal, e.g., security-signal energy that diffracts around the corners of enclosure 460. As a result, the security signal reaches (is above the receive threshold of) first key antenna 441 only through second barrier 440. If a skimmer attempts to communicate the security signal other than through port 415, the RF energy will be blocked by members 465.

Barriers 410 and 440, enclosure members 461, or RF-blocking members 465 can be solid sheets, grids, meshes, or other patterns. They can be formed from metals or other conductive materials. They can include materials designed to control electromagnetic radiation, such as composites described in U.S. Patent Publication No. 2003/0002045, incorporated herein by reference. They can be grounded or strapped to a common voltage source or respective voltage sources, in any combination. They can be electrically connected by selected resistances, e.g., <1Ω or <100Ω.

In various embodiments, actuator 490 moves first barrier 410 or second barrier 440 between an active position and a locked position (positions not shown) at selected times. In embodiments using enclosure 460, actuator 490 can rotate or translate enclosure 460 and barriers 410, 440 with it. Actuator 490 can include a piston or rack-and-pinion connected to barriers 410, 440 to slide one or both. Actuator 490 can translate or rotate barrier 410 or barrier 440. Actuator 490 can include a motor, servo or stepper. FIG. 4 shows the active position of barriers 410, 440. In the active position, peaks of interference patterns 429, 439, 449 are operatively aligned with their respective antennas, as discussed above. In the locked position, at least one of the patterns 429, 439, 449 is not operatively aligned with its corresponding antennas. For example, actuator 490 can move barrier 410 up to shift security interference pattern so that key antennas 441, 443 see equal RF power from the security signal. This will cause controller 486 in tag 430 to refuse to respond to the downlink signal, locking the tag against accesses. In another example, if enclosure 460 is rotated as a whole, reader antenna 421 will no longer be in the correct location to communicate with tag 430. Therefore, reader 420 is adapted to transmit the security and downlink signals, and to receive the uplink signal, when the first and second barriers are both in the active position. Any barrier that is not moved by actuator 490 is always in the active position. In various embodiments, a gate or shutter (not shown) blocks port 415 in the locked position but not in the active position, and actuator 410 moves the gate or shutter. Actuator 410 can move both the gate and the barriers or enclosure.

Figure 5:
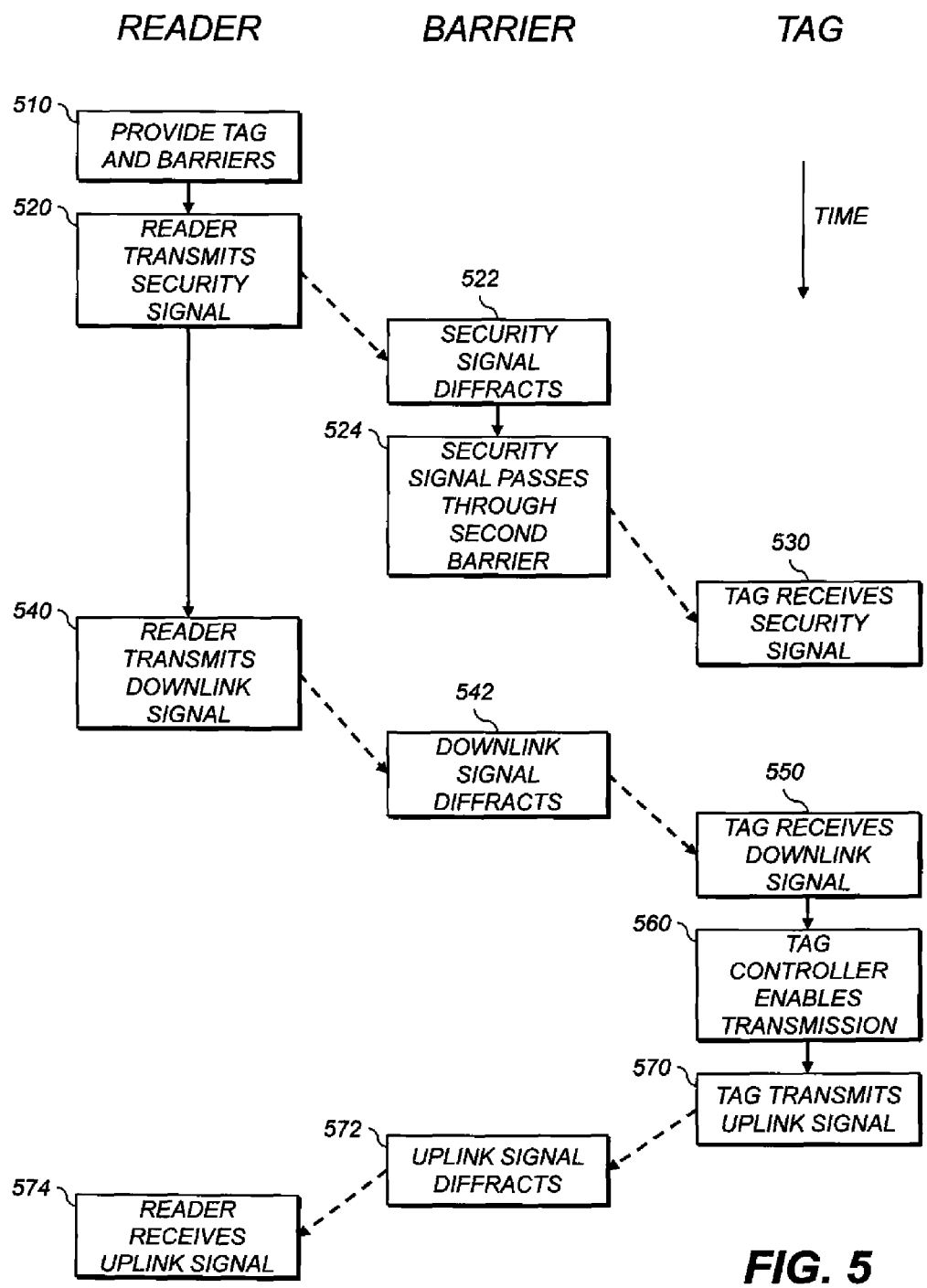
FIG. 5 is a flowchart of methods of communicating with an RFID tag.

FIG. 5 is a flowchart of methods of communicating with an RFID tag. Processing begins with step 510. Dashed lines represent signals; solid lines represent sequencing. The left-hand column represents actions at the reader, the center actions at the barrier, and the right-hand actions at the tag. Time increases down the page.

In step 510, an RFID tag is provided between two barriers. A first barrier has a port through which the reader can communicate with the tag. A second barrier passes some RF energy at a selected security frequency. Various examples of such a configuration are discussed above with respect to FIG. 4. Step 510 is followed by step 520.

In step 520, the reader transmits a security signal at the selected security frequency. Step 520 is followed by step 522 and, at a later time, by step 540. In the context of a signal, "followed by" means the signal emitted in one step (here, step 520) has a subsequent interaction in another step (here, step 522).

In step 522, the security signal diffracts as it passes through the port. The result is an interference pattern that strikes the second barrier. Step 522 is followed by step 524.

In step 524, at least some of the security signal passes through the second barrier. Step 524 is followed by step 530.

In step 530, the RFID tag receives the security signal via two or more key antennas disposed opposite the second barrier from the tag. In various embodiments, one key antenna is at the location of an expected peak of the security signal, and the other at the location of an expected null. This permits the tag to determine whether the received security signal was transmitted through the port, thereby producing the expected interference pattern, or was transmitted, e.g., by a skimmer, directly onto the key antennas. In various embodiments, the key antennas are spaced apart by less than one wavelength of the security signal. After step 530, if the security signal was received correctly, the tag waits for the downlink signal, discussed below (step 540).

In various embodiments, if the security signal is simultaneously received through the first and second key antennas at respective power levels within 5 dB of each other, the controller disables the link antenna and the method ends. The disabling can be for a selected amount of time or until reset, e.g., by an operator. The controller can also issue an alert to a monitoring system or operator if simultaneous detection occurs. This permits taking action in response to attempts by a skimmer to transmit a security signal directly to the key antennas, bypassing the port in the first barrier.

In step 540, after a selected amount of time has passed since the transmission of the security signal (step 520), the reader transmits a downlink signal at the selected downlink frequency. Step 540 is followed by step 542.

In step 542, the downlink signal diffracts as it passes through the port. The result is an interference pattern. If the reader's antenna is in the correct location, a peak of the interference pattern will strike the tag's antenna. If a skimmer in the wrong location attempts to contact the tag, the peak will not strike the antenna. For example, as the skimmer's antenna moves off-angle with respect to the direction from the reader's antenna to the port, the phase relationships of the wavefronts propagating through the port change. This changes the locations of peaks and nulls in the interference pattern. Step 542 is followed by step 550.

In step 550, the tag receives the diffracted downlink signal using a link antenna between the two barriers. The downlink signal can contain authorization or authentication codes or sequences. Step 550 is followed by step 560.

In step 560, since the correct security signal was received, and any codes in the downlink signal were correct, the controller enables transmission by the RFID tag. Step 560 is followed by step 570.

In step 570, since transmission is enabled, the tag transmits the uplink signal from the link antenna. In various embodiments, an uplink antenna different from the link antenna is used. Step 570 is followed by step 572.

In step 572, the uplink signal diffracts as it passes through the port. As a result, an interference pattern is formed on the side of the first barrier closer to the reader. Step 572 is followed by step 574.

In step 574, the reader receives the uplink signal. The reader's antenna is in position with respect to the interference pattern of the uplink signal to receive sufficient RF energy from the pattern to correctly acquire the signal. In various embodiments, steps 540-574 are repeated for multiple exchanges in an authentication or authorization sequence (e.g., multi-party Diffie-Hellman key exchange), or for exchanges of data.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

Parts List 9 battery
10 base station
12 air interface
14 reader
16 reader's antenna
18 memory unit
20 logic unit
22, 24, 26 RFID tag
30, 44, 48 antenna
42 RF station
52 range
54 antenna
56 power converter
58 demodulator
60 modulator
62 clock/data recovery circuit
64 control unit
80 output logic
310 data-processing system
320 peripheral system
330 user-interface system
340 data-storage system
410 barrier
415 port
415A, 415B aperture
416A, 416B shortest dimension
417A, 417B centroid
420 reader
421 reader antenna
422 reader-antenna location
429 uplink interference pattern
Parts List-continued
430 RFID tag
431 link antenna
432 link-antenna location 434 electrical connector
439 downlink interference pattern
440 barrier
441 key antenna
442 peak-antenna location
443 key antenna
444 null location
449 security interference pattern
460 enclosure
461 enclosure member
463 RF-attenuating member
465 RF-blocking member
486 controller
490 actuator
499 non-RFID-active object
510 provide tag and barriers step
520 reader transmits security signal step
522 security signal diffracts step
524 security signal passes through second barrier step
530 tag receives security signal step
540 reader transmits downlink signal step
542 downlink signal diffracts step
550 tag receives downlink signal step
560 tag controller enables transmission step
570 tag transmits uplink signal step
572 uplink signal diffracts step
574 reader receives uplink signal step

The invention claimed is:

1. A radio frequency identification (RFID) system, comprising:
  a) an RFID reader having an antenna located at a reader-antenna location, the RFID reader adapted to transmit a security signal at a selected RF security frequency and a downlink signal at a selected RF downlink frequency and to receive an uplink signal at a selected RF uplink frequency;
  b) a first RF-attenuating barrier spaced apart from the antenna of the RFID reader, wherein:
    i) the first RF-attenuating barrier includes a port having first and second apertures, each aperture having a respective centroid and a respective selected shortest dimension, and the centroids being spaced apart by a respective centroid spacing, so that a security interference pattern is formed on a side of the first RF-attenuating barrier opposite the antenna of the RFID reader when the security signal passes through the port, a downlink interference pattern is formed on a side of the first RF-attenuating bather opposite the antenna of the RFID reader when the downlink signal passes through the port and an uplink interference pattern is formed on a side of the first RF-attenuating barrier towards the RFID reader when the uplink signal passes through the port; and
    ii) the RF-attenuating first barrier is positioned with respect to the reader-antenna location to define a link-antenna location at which the downlink interference pattern provides a selected downlink power at the link-antenna location, and at which the uplink interference pattern provides a selected uplink power at the reader-antenna location;
  c) a second RF-attenuating barrier spaced apart from the first RF-attenuating barrier and on the opposite side thereof from the antenna of the RFID reader, wherein:
    i) the link-antenna location is between the first and second RF-attenuating bathers;
    ii) the second RF-attenuating barrier attenuates the security interference pattern less than the downlink interference pattern; and
    iii) the second RF-attenuating barrier is positioned with respect to the first RF-attenuating barrier to define one or more peak-antenna locations at peaks of the security interference pattern;
  d) an RFID tag including:
    i) a link antenna disposed at the link-antenna location;
    ii) first and second key antennas disposed beyond a side of the second RF-attenuating barrier farthest from the antenna of the RFID reader, wherein the first key antenna is disposed at one of the one or more peak-antenna locations and the second key antenna is not disposed at one of the one or more peak-antenna locations; and
    iii) a controller adapted to transmit the uplink signal using the link antenna after first receiving the security signal at the first key antenna but not at the second key antenna, and thereafter receiving the downlink signal using the link antenna.

2. The system according to claim 1, further including one or more enclosure members connected to the first and second RF-attenuating barriers to form an RF-attenuating enclosure around the link antenna.

3. The system according to claim 2, further including RF-attenuating material positioned inside the RF-attenuating enclosure.

4. The system according to claim 1, further including one or more RF-blocking members connected to the second RF-attenuating barrier so that the security signal reaches the first key antenna only through the second RF-attenuating barrier.

5. The system according to claim 4, further including RF-attenuating material positioned inside the one or more RF-blocking members.

6. The system according to claim 1, wherein the first key antenna receives the security signal at a power at least 20 dB higher than the second key antenna.

7. The system according to claim 1, wherein the controller is further adapted to disable the link antenna in response to receiving the security signal through the first and second key antennas simultaneously at power levels within 5 dB of each other.

8. The system according to claim 1, wherein the selected RF uplink frequency is greater than the selected RF downlink frequency.

9. The system according to claim 1, wherein the controller in the RFID tag is powered by RF energy received by the first key antenna.

10. The system according to claim 1, wherein the selected RF security frequency is less than the selected RF downlink frequency.

11. The system according to claim 1, further including an actuator adapted to move the first RF-attenuating barrier or the second RF-attenuating barrier between an active position and a locked position at selected times, wherein the reader is adapted to transmit the security and downlink signals and receive the uplink signal when the first or second RF-attenuating bathers are in the active position.

* * * * *